May 10, 1960 — H. HURVITZ — 2,936,416

FREQUENCY INDICATOR

Filed June 11, 1954

INVENTOR

United States Patent Office 2,936,416
Patented May 10, 1960

2,936,416

FREQUENCY INDICATOR

Hyman Hurvitz, Washington, D.C., assignor to the United States of America as represented by the Secretary of the Air Force Application June 11, 1954, Serial No. 435,986

8 Claims. (Cl. 324—77)

The present invention relates generally to frequency indicators, and more particularly to systems for indicating the frequencies of ultra-sonic waves.

Briefly describing the present invention, ultra-sonic waves are generated by a transducer, and transmitted to a plurality of resonant chambers, each of which is resonant to a different frequency. The chambers may be fabricated of birefringent material, or may be fabricated of non-birefringent materials and impregnated with triboluminescent materials, or may be both fabricated of birefringent materials and impregnated with triboluminescent materials. The amplitude of ultra-sonic waves will be greatest in that one of the chambers which is resonant to the waves, and hence a visual indication of the waves, whether due to triboluminescence or to birefringence, or to both, will be greatest in that chamber. If desired, the waves may be selectively diffracted in accordance with their frequencies to the chambers with which they are resonant.

It is, accordingly, a broad object of the present invention to enhance luminous effects responsive to ultra-sonic waves by directing the waves into chambers resonant to the waves.

It is another object of the invention to provide a visual indication in response to ultra-sonic waves by directing the waves into a resonant chamber fabricated of birefringent material, and causing the birefringent material to shift the plane of polarization of polarized light.

It is a further object of the present invention to provide a visual indication in response to ultra-sonic waves by directing the waves into a resonant chamber impregnated with triboluminescent material.

In accordance with still another object of the present invention, ultra-sonic waves are directed into a chamber which is fabricated of birefringent material and impregnated with triboluminescent material, and the waves are visually indicated by virtue of triboluminescence and birefringence.

The above and still further objects, features, and advantages of the present invention will become apparent upon consideration of the following detailed description of one specific embodiment thereof, especially when taken in conjunction with the accompanying drawings, wherein.

Figure 1:
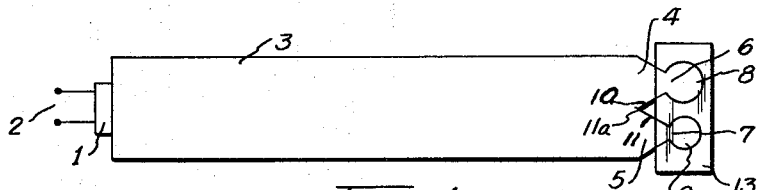
Figure 1 is a view in side elevation of a first embodiment of the invention, which provides visual effects by virtue of resonance of a birefringent chamber.

Referring now more particularly to the accompanying drawings, the reference numeral 1 denotes an ultra-sonic transducer provided with suitable electric signals, via leads 2, which may provide either of two frequencies, or both together. The waves travel along a strip of material 3, which may be fabricated of birefringent material, such as Pyrex glass, quartz, Lucite, or the like. At the far end of the strip 3 is provided two slowly narrowing funnels 4, 5, which are continuations of the strip 3, and which lead via relatively narrow openings, 6, 7, of the same material, into cylindrical chambers, 8, 9, respectively, also of the same material, assuming longitudinal waves in the strip 3.

It will be noted that adjacent walls 10, 11, of adjacent funnels 4, 5, join in a relatively short lateral line 11a, so that substantially all the ultra-sonic energy is constrained to proceed to one or the other of the resonant chambers 8, 9, and substantially no ultra-sonic energy is reflected back toward the origin. The angle of the taper of the funnels 4, 5, is about 30°, so that reflections from the walls of the tapering structure lead the energy, by one or more reflections into the chambers.

The chambers 8, 9, are separately resonant to different ones of the frequencies present in the ultra-sonic waves, and since the openings to the chambers are small, but little of the energy can escape from the chambers, but is all absorbed therein. Because the chambers are resonant tremendous mechanical forces are generated therein.

Assuming that the chambers are fabricated of birefringent material, and are continuations of the strip 3, to avoid reflections, a polarizer 12 and light source L may be placed on one side of the chambers, and an analyzer 13 on the other. In the absence of mechanical stresses in the chamber the polarizer 11 polarizes the light from the source L, and the analyzer 13 blocks the polarized light. No light is then visible as viewed from the side of the analyzer 12.

In the presence of ultra-sonic waves the birefringent material of the chambers 8, 9, is stressed, and shifts the plane of polarization of the polarized light sufficiently that it may be viewed through the analyzer 12.

Figure 3:
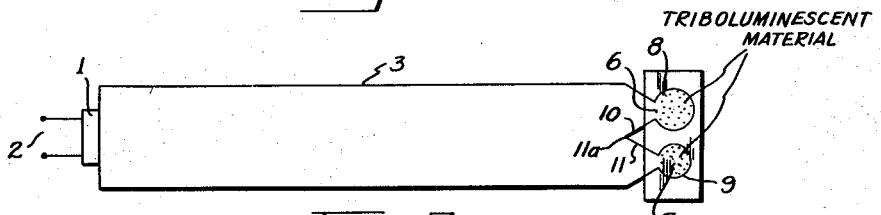
Figure 3 is a view in side elevation of a modification of the system of Figure 1, wherein the resonant chamber is impregnated with triboluminescent material.

The quantity of visible light produced may be enhanced, as in Figure 3, by incorporating into the chambers 8, 9, a quantity of suitable triboluminescent powders, such as tetr. $ZnF_2$:Mn; Cub. ZnS:Mn and Caz. $P_2O_7$:Dy and if desired, the luminosity of the latter may be solely relied on, in which case the polarizer 11, light source L, and analyzer 12 may be dispensed with, and in fact the material of the strip 3 need not be birefringent but may comprise mercury, or oil, or water, in a suitable container.

Figure 2:
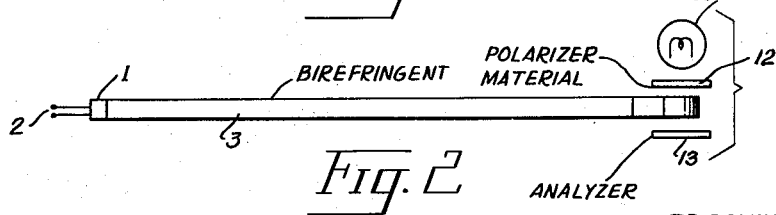
Figure 2 is a view in plan, of the structure of Figure 1.
Figure 4:
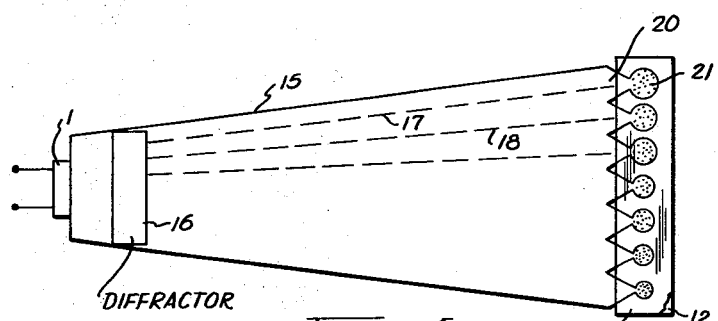
Figure 4 is a further modification of the system of Figure 3, wherein ultra-sonic waves are selectively diffracted to a plurality of resonant chambers, in accordance with the frequencies of the waves.

Referring now to Figure 4 of the accompanying drawings, ultra-sonic waves generated by the transducer 1 are applied to a strip 15, which may be fabricated of birefringent material. The waves are diffracted to different paths, 17, 18, . . . in accordance with their frequencies, by a diffractor 16, such as an ultra-sonic prism, grating, or the like, and a plurality of frequencies may be simultaneously present, if desired. Each path, in which may be assumed present waves of a single frequency, is directed via a funnel, as 20, to a chamber 21 resonant to that frequency. A polarizer 11 and light source L may be arranged on one side of the chambers, and an analyzer 12 on the other, as in Figures 1–3 inclusive, and the strip 15 and the separate chambers be fabricated of birefringent material, with or without triboluminescent material incorporated in the chambers. If the triboluminescent material is incorporated, the strip need not be birefringent, although obviously a more intense visual indication may be produced by employing visual indication due to both birefringence and triboluminescence than may be produced by either alone.

Figure 5:
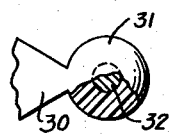
Figure 5 illustrates a modification of the chambers of Figures 1–4, inclusive.

Referring now to Figure 5 of the accompanying drawings, there is illustrated a funnel 30, which may have the shape of a truncated cone, i.e. of circular transverse cross section. The funnel 30 leads to a chamber 31 of spherical shape, so that chamber 31 may be resonant to any type of waves, shear or longitudinal, or both. Further, the diameter of the chamber 31 may be many times, or several times the length of one-half wavelength of the ultra-sonic energy therein, i.e. may have a diameter of $\omega\lambda$ where $\omega$ is an integer, and $\lambda$ an ultra-sonic wavelength. A triboluminescent sphere 32 (or a plurality of such), may be included in the chamber 31, the sphere 32 being fabricated of any of the triboluminescent powders above referred to, with suitable binder, and the sphere 32 may itself be resonant to the ultra-sonic waves, by reason of its diameter. By placing the sphere 32 symmetrically of the chamber 31 the space between the sphere 32 and the chamber 31 may form a resonant chamber, and in another limit the sphere 31 may be rather densely packed with triboluminescent material, so that in effect the chamber is a resonant triboluminescent sphere.

While I have described and illustrated one specific embodiment of my invention, it will be clear that variations thereof may be resorted to without departing from the true spirit and scope of the invention as defined in the appended claims.

What I claim is:

1. A device for indicating frequencies comprising an ultrasonic transducer subjected to a spectrum of electric waves and producing a like spectrum of sonic waves, means for directing said sonic waves differently as a function of their frequencies, a plurality of resonant chambers in the paths of said sonic waves, each chamber mechanically resonant to waves of the frequency directed toward that chamber, each of said resonant chambers including means for visualizing sonic waves internal thereof.

2. The combination in accordance with claim 1 wherein each of said chambers is provided with a tapered sonic passageway narrowing thereinto.

3. The combination in accordance with claim 1 wherein each of said resonant chambers is birefringent.

4. The combination in accordance with claim 1 wherein triboluminescent material is incorporated in each of said chambers.

5. A device for analyzing frequencies comprising a source of ulta-sonic waves, an extended conduit for said waves, means for diffracting said waves within said conduit at angles which are functions of frequency of said waves, a plurality of wave guiding and collecting passages sonically coupled to said conduit, a mechanically resonant chamber sonically coupled to each of said conduits, and means for producing a visual indication of sonic energy in said chambers, said chambers each resonant to a different one of said frequencies.

6. A sonic frequency analyzing device, comprising a source of sonic waves differentially angularly diffracted in accordance with their frequencies, chambers resonant to the separate frequencies and each positioned in the path of a diffracted wave to which it is resonant, and means for visually indicating the presence of resonating waves within each of said chambers.

7. A sonic frequency analyzing device, said device including means for directing sonic waves of different frequencies in the same paths, mechanically resonant visual indicators intercepting said paths, each of said mechanically resonant visual indicators resonant to a different one of said frequencies.

8. The combination in accordance with claim 7 wherein said resonant visual indicators are birefringent.

References Cited in the file of this patent

UNITED STATES PATENTS

| Number | Name | Date |
|---|---|---|
| 1,685,810 | Giebe et al. | Oct. 2, 1928 |
| 2,169,304 | Tournier | Aug. 15, 1939 |
| 2,416,338 | Mason | Feb. 25, 1947 |
| 2,418,964 | Arenburg | Apr. 15, 1947 |
| 2,423,459 | Mason | July 8, 1947 |
| 2,449,880 | Cox | Sept. 21, 1948 |
| 2,455,389 | Soller | Dec. 7, 1948 |
| 2,508,098 | Chilowsky | May 16, 1950 |
| 2,532,175 | Linder | Nov. 28, 1950 |
| 2,596,460 | Arenberg | May 13, 1952 |
| 2,630,534 | Heinecke et al. | Mar. 3, 1953 |
| 2,632,521 | Eaton | Mar. 25, 1953 |
| 2,643,286 | Hurvitz | June 23, 1953 |
| 2,663,848 | Lewis | Dec. 22, 1953 |